United States Patent Office 3,176,025
Patented Mar. 30, 1965

3,176,025
N,N'-BIS(LOWER ALKYLCARBAMOYL)-
ACTINOSPECTINOIC ACID
Paul F. Wiley, Texas Township, Kalamazoo County,
Mich., assignor to The Upjohn Company, Kalamazoo,
Mich., a corporation of Delaware
No Drawing. Original application Jan. 22, 1962, Ser.
No. 167,932. Divided and this application June 3,
1963, Ser. No. 284,820
6 Claims. (Cl. 260—347.3)

This a division of application Serial No. 167,932, filed January 22, 1962.

This invention relates to novel compositions of matter and to a process for the preparation thereof and is particularly directed to novel carbamoyl derivatives of actinospectacin and actinospectinoic acid and to a process for producing the same.

Actinospectacin is a biosynthetic product produced by the controlled fermentation of *Streptomyces spectabilis*. Various methods for the production, recovery and purification of actinospectacin are described in the published literature, e.g., D. J. Mason et al., Antibiotics and Chemotherapy, 11, p. 118, 1961; M. E. Bergy et al., Antibiotics and Chemotherapy, 11, p. 661, 1961, Union of South Africa Patent No. 60/4,098 and Belgian Patent No. 596,175. Actinospectacin is characterized by an optical rotation $[\alpha]D^{25} = -20°$ ($H_2O$); by solubility in water, methanol, and ethanol, and by insolubility in acetone and hydrocarbon solvents; and by the presence of two basic groups: $pKa_1$ 695 ($H_2O$), $pKa_2$ 8.70 ($H_2O$). It was formerly thought that the molecular formula was $C_{14}H_{26}N_2O_7$, but it has since been shown that the molecular formula is $C_{14}H_{24}N_2O_7$.

It has now been found that novel compounds according to this invention are obtained by acting upon actinospectacin with a lower alkyl isocyanate to produce the N,N'-bis(lower alkylcarbamoyl)actinospectacin (I), which upon reacting with an alkaline material is converted to N,N'-bis(low alkylcarbamoyl)actinospectinoic acid (II).

Subsequent to this invention the structure of actinospectacin has been elucidated. The novel compounds of the invention, therefore, can now be represented by the following formulae:

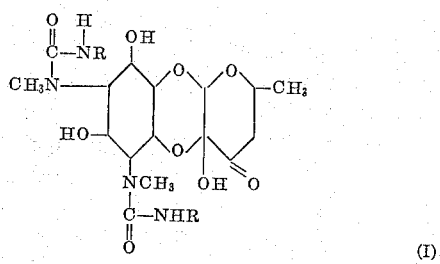

wherein R is lower alkyl.

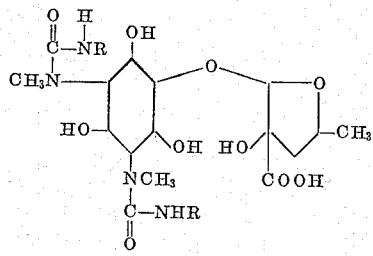

wherein R is lower alkyl. The term "lower alkyl" whenever used in the specification or claims refers to alkyl of one to eight carbon atoms, inclusive, e.g., methyl, ethyl, propyl, butyl, amyl, hexyl, heptyl, octyl, and the isomeric forms thereof.

It has now been found that novel compounds according to this invention are obtained by acting upon actinospectacin with a mixture of dry chloroform and an appropriate lower alkyl isocyanate to yield the corresponding N,N'-bis(lower alkylcarbamoyl)actinospectacin (I). For example, on reacting actinospectacin with a mixture of dry chloroform and ethyl isocyanate, N,N'-bis(ethylcarbamoyl)actinospectacin (I) is obtained. Likewise, on reacting actinospectacin with a mixture of dry chloroform and propyl isocyanate, N,N'-bis(propylcarbamoyl)actinospectacin is obtained.

It has also been found that novel compounds, according to this invention, are obtained by acting upon N,N'-bis (lower alkylcarbamoyl)actinospectacin (I) with an alkaline material to yield N,N'-bis(lower alkylcarbamoyl) actinospectinoic acid (II). For example, on reacting N,N'-bis(propylcarbamoyl)actinospectacin (I) with barium hydroxide there is obtained N,N'-bis(ethylcarbamoyl)actinospectinoic acid (II). Likewise, on reacting N,N'-bis(ethylcarbamoyl) actinospectacin (I) with barium hydroxide, there is obtained N,N'-bis(propylcarbamoyl)actinospectinoic acid (II).

Alternatively, the novel compounds of the invention can be produced by first converting actinospectacin to actinospectinoic acid and then reacting actinospectinoic acid with a mixture of dry chloroform and an appropriate lower alkyl isocyanate. For example, on reacting actinospectinoic acid with a mixture of dry chloroform and ethyl isocyanate, N,N'-bis(ethylcarbamoyl)actinospectinoic acid (II) is obtained. Likewise, on reacting actinospectinoic acid with a mixture of dry chloroform and propyl isocyanate, N,N'-bis(propylcarbamoyl actinospectinoic acid (II) is obtained.

Actinospectacin can be converted to actinospectinoic acid in the same manner that N,N'-bis(lower alkylcarbamoyl) actinospectacin (I) is converted to N,N'-bis-(lower alkylcarbamoyl)actinospectinoic acid (II). Thus, the conversion in each instance is accomplished by reacting the starting material with an alkaline material, e.g., an alkali metal hydroxide, for example, sodium hydroxide, potassium hydroxide, lithium hydroxide, and the like, an alkaline earth metal hydroxide, for example, calcium hydroxide, barium hydroxide, an alkali metal carbonate, for example, sodium carbonate, potassium carbonate, and the like. Conversion to actinospectinoic acid and N,N'-bis (loweralkylcarbamoyl)actinospectinoic acid (II) is also effected when actinospectacin and N,N'-bis(lower alkylcarbamoyl)actinospectacin (I) are brought into contact with or passed over a strongly basic anion exchange resin. [Suitable anion exchange resins for this purpose are obtained by chloromethylating by the procedure given on pages 88 and 97 of Kunin, Ion Exchange Resins, 2nd Ed. (1958), John Wiley and Sons, Inc., polystyrene crosslinked, if desired, with divinylbenzene prepared by the procedure given on p. 84 of Kunin, supra, and quaternizing with trimethylamine, or dimethylalkanolamine by the procedure given on page 97 of Kunin, supra. Anion exchange resins of this type are marketed under the trade names Dowex-2, Dowex-20, Amberlite-IRA-400, Duolite A-102, and Permutit S-1.] The desired product is isolated from the reaction medium and is utilized as the free acid or other derivatives prepared therefrom.

The invention embodies the formation of various salts of N,N'-bis(lower alkylcarbamoyl)actinospectinoic acid (II), for example, those obtained when N,N'-bis(lower alkylcarbamoyl)actinospectinoic acid is reacted with an alkali metal hydroxide (including ammonium), alkaline earth metal hydroxide (including magnesium) and an amine, for example, mono-, di-, and trimethylamine.

Actinospectacin and N,N'-bis(lower alkylcarbamoyl) actinospectacin (I) are hydrolyzed at a pH between about 11.0 and about 13.0 and preferably at about 12.0. The reaction is usually conducted between about 15° and about 30° C. although higher temperatures can be used successfully.

Actinospectinoic acid and N,N'-bis(lower alkylcarbamoyl)actinospectinoic acid (II) can be recovered from the reaction medium by a variety of procedures. A typical recovery procedure proceeds in the following manner. After hydrolysis with barium hydroxide the reaction medium is adjusted to a pH between about 8 and about 9 with sulfuric acid, and the resulting mixture is centrifuged to remove the insoluble salt. The solution is then evaporated to dryness under reduced pressure and then further purified in a Craig countercurrent distribution apparatus. When hydrolysis is effected by use of an ion exchange resin procedure, the resin is washed with ammonia and neutralized with an appropriate mineral acid, for example, hydrochloric acid, phosphoric acid, sulfuric acid, and the like, after which further purification is effected by use of a Craig countercurrent distribution.

The novel compounds of the invention, N,N'-bis(lower alkylcarbamoyl)actinospectacin can be used as intermediates to make N,N'-bis(lower alkylcarbamoyl)actinospectinoic acids which are useful as buffering agents and as intermediates. The carboxyl group in N,N'-bis(lower alkylcarbamoyl)actinospectinoic acid can be esterified in accordance with U.S. Patent 2,220,521 to form beta-thiocyanoethyl esters useful for the purposes, especially as insecticides, described in this patent. The carboxyl group can also be esterified with lower diazoalkanes, e.g., diazomethane and diazoethane, to produce the lower alkyl esters. The esters can be utilized to purify the acids; thus by esterifying a crude acid, isolating the ester, and hydrolyzing it, the acid is upgraded. The carbonyl in N,N'-bis(lower alkylcarbamoyl)actinospectacin can be reacted with carbonyl binding agents, for example, semicarbazide, thiosemicarbazide, and 2,4-dinitrophenylhydrazine to form the corresponding carbazones and hydrazones. The carbazones and hydrazones are useful for upgrading the N,N'-bis(lower alkylcarbamoyl)actinospectacin. The keto group can be regenerated by reacting the carbazones and hydrazones with an α-keto-acid, for example, pyruvic acid.

The following examples are illustrative of the process and products of the present invention, but are not to be construed as limiting.

EXAMPLE 1

N,N'-bis(ethylcarbamoyl)actinospectacin

A mixture of 10.0 grams of actinospectacin, 4.3 grams of ethyl isocyanate and 1000 ml. of anhydrous chloroform was stirred at room temperature for 48 hours. The mixture was then filtered and the filtrate evaporated to dryness under reduced pressure. The residue was dissolved in 30 ml. of warm acetone; five volumes of Skellysolve B (isomeric hexanes) was added to the solution. Precipitation occurred and the precipitate was triturated until it was a firm solid. It was then removed by filtration to yield 9.5 grams of material melting at 201–211° C. This material was distributed through 500 transfers in a Craig countercurrent distribution apparatus using an n-butanol-water system (1:1). Peak fractions were combined and evaporated to dryness under reduced pressure. The resulting residue was dissolved in 100 ml. of water. This solution was then filtered and freeze-dried to give 5.1 grams of N,N'-bis(ethylcarbamoyl)actinospectacin having a melting point range of 210–218° C. with prior softening at 188° C., an optical rotation $[\alpha]_D^{25} = -8°$ (c., 0.84 in $H_2O$), no titratable groups, and characteristic infrared absorption at the following wave lengths expressed in reciprocal centimeters:

3365 (S) cm.$^{-1}$    1169 (S)
1740 (S)              1158 (S)
1615 (S)              1125 (S)
1535 (S)

Elemental analysis.—Calculated for $C_{20}H_{34}N_4O_9$: C, 50.63; H, 7.23; N, 11.81; O, 30.33. Found: C, 50.57; H, 7.20; N, 12.01; O, 30.01.

EXAMPLE 2

By substituting the ethyl isocyanate in Example 1 by methyl, propyl, butyl, amyl, hexyl, heptyl, and octyl isocyanate the corresponding N,N'-bis(methylcarbamoyl), N,N'-bis(propylcarbamoyl), N,N'-bis(butylcarbamoyl), N,N'-bis(amylcarbamoyl), N,N'-bis(hexylcarbamoyl), N,N'-bis(heptylcarbamoyl), and N,N'-bis(octylcarbamoyl)actinospectacin is obtained.

EXAMPLE 3

N,N'-bis(ethylcarbamoyl)actinospectinoic acid

Five grams of N,N'-bis(ethylcarbamoyl)actinospectacin was dissolved in 25 ml. of 0.1 N barium hydroxide solution. The solution was allowed to stand at room temperature for five hours. The barium hydroxide was precipitated as barium sulfate by addition of 0.1 N sulfuric acid until no more barium ion was present. There was also no sulfate ion in solution. The precipitate was removed by centrifugation. The supernatant was filtered, and the filtrate was freeze dried. This product was distributed through 500 transfers in a Craig Countercurrent Distribution apparatus using a n-butanol-water system (1:1). The material from tubes 180–260 was combined, and the solvent was removed by evaporation under reduced pressure at a temperature of 35–40° C. The residue was dissolved in 50 ml. of water. This solution was filtered and freeze dried yielding 1.35 g. of N,N'-bis(ethylcarbamoyl)actinospectinoic acid having a melting point of 165–171° C., an optical rotation $[\alpha]_D^{25}$ −63° (c., 1% in $H_2O$), an equivalent weight of 581 and a pKa' 3.57.

Elemental analysis.—Calculated for $C_{20}H_{36}N_4O_{10}$: C, 48.77; H, 7.37; N, 11.40. Found: C, 48.15; H, 7.34; N, 10.78.

I claim:

1. N,N'-bis(alkylcarbamoyl)actinospectinoic acid, a compound of the formula:

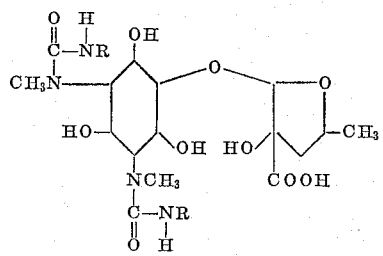

wherein R is lower alkyl.

2. N,N'-bis(lower alkylcarbamoyl)actinospectinoic acid lower alkyl esters.

3. A process which comprises reacting N,N'-bis(lower alkylcarbamoyl)actinospectacin with an alkaline material to produce N,N'-bis(lower alkylcarbamoyl)actinospectinoic acid.

4. A process which comprises reacting N,N'-bis(ethylcarbamoyl)actinospectacin with barium hydroxide to produce N,N'-bis(ethylcarbamoyl)actinospectinoic acid.

5. N,N'-bis(ethylcarbamoyl)actinospectinoic acid.

6. A member of the group consisting of the alkali metal, alkaline earth metal, and aliphatic amine salts selected from the group consisting of monomethylamine, dimethylamine, and trimethylamine of N,N'-bis(lower alkylcarbamoyl)actinospectinoic acid.

References Cited by the Examiner

UNITED STATES PATENTS

| | | | |
|---|---|---|---|
| 2,662,892 | 12/53 | Johnson | 260—340.3 |
| 2,910,484 | 10/59 | De Stevens | 260—340.3 |
| 3,013,023 | 12/61 | Ueno | 260—347.3 |
| 3,014,046 | 12/61 | Speziale | 260—347.3 |

OTHER REFERENCES

Pinner: Chem. and Tech. of Organic Isocyanates, Plastics (April 1947), at pages 206–8.

NICHOLAS S. RIZZO, *Primary Examiner.*

WALTER A. MODANCE, *Examiner.*

UNITED STATES PATENT OFFICE
CERTIFICATE OF CORRECTION

Patent No. 3,176,025 March 30, 1965

Paul F. Wiley

It is hereby certified that error appears in the above numbered patent requiring correction and that the said Letters Patent should read as corrected below.

Column 1, line 30, for "695" read -- 6.95 --; column 2, line 22, for "(propylcarbamoyl)" read -- (ethylcarbamoyl) --; line 25, for "(ethylcarbamoyl)" read -- (propylcarbamoyl) --.

Signed and sealed this 21st day of September 1965.

(SEAL)
Attest:

ERNEST W. SWIDER
Attesting Officer

EDWARD J. BRENNER
Commissioner of Patents